United States Patent
Mena Dominguez (10) Patent No.: US 10,753,224 B2
(45) Date of Patent: Aug. 25, 2020

(54) VARIABLE STATOR VANE ACTUATOR OVERLOAD INDICATING BUSHING

(71) Applicant: General Electric Company, Schenectady, NY (US)

(72) Inventor: Rodolfo Mena Dominguez, Queretaro (MX)

(73) Assignee: General Electric Company, Schenectady, NY (US)

( * ) Notice: Subject to any disclaimer, the term of this patent is extended or adjusted under 35 U.S.C. 154(b) by 317 days.

(21) Appl. No.: 15/498,590

(22) Filed: Apr. 27, 2017

(65) Prior Publication Data

US 2018/0313222 A1 Nov. 1, 2018

(51) Int. Cl.
*F01D 17/04* (2006.01)
*F01D 17/16* (2006.01)
(Continued)

(52) U.S. Cl.
CPC ............... *F01D 17/04* (2013.01); *B60S 1/02* (2013.01); *F01D 17/16* (2013.01); *F01D 17/162* (2013.01); *F02C 7/20* (2013.01); *F05D 2260/80* (2013.01)

(58) Field of Classification Search
CPC ...... F01D 17/04; F01D 17/162; F01D 25/162; F01D 9/041; F01D 17/14; F05D 2260/80;
(Continued)

(56) References Cited

U.S. PATENT DOCUMENTS 2,905,511 A * 9/1959 Cerness ............... F16C 27/02
384/294
3,314,595 A * 4/1967 Burge ............... F04D 29/563
415/160
(Continued)

FOREIGN PATENT DOCUMENTS

CN 101999046 3/2011
CN 103659788 3/2014
(Continued)

OTHER PUBLICATIONS

National Intellectual Property Administration, P. R. China, "Decision on Rejection", issued in connection with Chinese Application No. 201810394203.1, dated Mar. 3, 2020, 7 pages.

*Primary Examiner* — Sizo B Vilakazi
*Assistant Examiner* — Brian R Kirby
(74) *Attorney, Agent, or Firm* — Hanley, Flight & Zimmerman, LLC (57) ABSTRACT

A bushing includes cylindrical body depending from preferably annular polygonal flange, bore extending through flange and body, and at least one overload indicator. Overload indicator may be frangible such as frangible tab at distal end of indicator tab depending from body or frangible coupons extending between forward and aft sections of polygonal flange. Frangible tab and coupons may include distinctive mark discernible or visible under visible or ultraviolet light. Bushing may be used in unison ring of high pressure compressor assembly to connect lever arms, coupled to variable vanes, to unison ring. Pins disposed in (Continued)

bore of bushing couple arm to unison ring. Forward and aft overhangs may depend from forward and aft sections of polygonal flange and overhang forward and aft annular sides of unison ring.

25 Claims, 4 Drawing Sheets (51) Int. Cl.
  *B60S 1/02* (2006.01)
  *F02C 7/20* (2006.01)
(58) Field of Classification Search
  CPC ............ F05D 2220/32; F05D 2300/43; F05D 2300/10; F05D 2260/50; F16C 31/02; F16C 33/20; F16C 2360/23
  USPC .................................................. 415/118, 160
  See application file for complete search history.

(56) References Cited

U.S. PATENT DOCUMENTS

| | | | | |
|---|---|---|---|---|
| 3,512,447 A * | 5/1970 | Vaughn | ................ | F16B 31/021 411/5 |
| 3,628,816 A * | 12/1971 | Ross, Jr. | ............. | F16B 19/1081 403/2 |
| 3,685,920 A * | 8/1972 | Burge | .................. | F01D 17/162 415/147 |
| 3,871,226 A * | 3/1975 | Janiszewski | ........... | B21D 37/10 72/456 |
| 3,897,988 A * | 8/1975 | Dickinson | .............. | B65G 39/09 384/539 |
| 3,945,695 A * | 3/1976 | Speakman | ............ | F16C 33/102 384/291 |
| 3,984,132 A | 10/1976 | Sarson | | |
| 4,034,441 A * | 7/1977 | Kupcikevicius | ... | A22C 11/0254 452/38 |
| 4,050,771 A * | 9/1977 | Watson | ................... | H01R 9/18 439/736 |
| 4,050,831 A * | 9/1977 | DuBois | ................. | F02M 19/12 403/243 |
| 4,050,844 A * | 9/1977 | Miller | ................... | F01D 17/162 415/147 |
| 4,363,580 A | 12/1982 | Bell | | |
| 4,365,906 A * | 12/1982 | King | ........................ | B63H 9/10 403/157 |
| 4,463,777 A * | 8/1984 | Taniguthi | ................. | F16D 9/08 137/553 |
| 4,483,648 A * | 11/1984 | Trungold | ............. | F16B 31/028 411/10 |
| 4,616,522 A * | 10/1986 | White | .................... | B62D 1/195 188/376 |
| 4,750,878 A * | 6/1988 | Nix | ........................ | B25B 27/28 384/295 |
| 4,925,364 A * | 5/1990 | Das | ....................... | F01D 17/162 415/150 |
| 4,942,974 A * | 7/1990 | Larrison | ............. | B65D 43/021 220/214 |
| 5,024,118 A * | 6/1991 | Khalifa | ................. | B62D 1/195 188/376 |
| 5,088,866 A * | 2/1992 | Ischebeck | ............. | F16B 31/028 116/212 |
| 5,451,110 A * | 9/1995 | Gams, Jr. | .................. | B02C 2/06 116/208 |
| 5,593,275 A * | 1/1997 | Venkatasubbu | ....... | F01D 17/162 415/160 |
| 5,601,401 A * | 2/1997 | Matheny | ............... | F01D 17/162 415/160 |
| 5,845,947 A * | 12/1998 | Arabia, Jr. | .......... | E05B 17/0062 292/1 |
| 6,139,261 A * | 10/2000 | Bishop | .................. | F16C 3/00 415/148 |
| 6,244,804 B1 * | 6/2001 | Hodge | .................... | F16B 31/02 116/212 |
| 6,332,715 B1 * | 12/2001 | Kuzuu | ................. | F16C 13/00 384/276 |
| 6,557,874 B2 * | 5/2003 | Fader | .................. | B60G 21/0551 267/293 |
| 6,604,882 B2 * | 8/2003 | Gordon | ................... | F16G 11/00 24/122.6 |
| 6,669,393 B2 | 12/2003 | Schilling | | |
| 6,682,299 B2 | 1/2004 | Bowen et al. | | |
| 6,767,183 B2 * | 7/2004 | Schilling | .............. | F01D 17/162 415/160 |
| 6,884,025 B2 * | 4/2005 | Pickens | ................... | F01D 17/16 415/160 |
| 6,942,255 B2 * | 9/2005 | Pickering | .............. | F16L 37/252 285/136.1 |
| 6,984,104 B2 * | 1/2006 | Alexander | ............ | F01D 17/162 415/159 |
| 7,004,723 B2 * | 2/2006 | Raulin | .................. | F01D 17/162 415/160 |
| D517,900 S * | 3/2006 | Goldenberg | ................... | D8/354 |
| 7,032,690 B2 * | 4/2006 | Ramey | ...................... | E21B 3/04 166/88.2 |
| 7,093,996 B2 * | 8/2006 | Wallace | .................. | B64D 27/26 403/78 |
| 7,353,561 B2 * | 4/2008 | Morin | ................... | B60S 1/0488 15/250.3 |
| 7,445,427 B2 * | 11/2008 | Gutknecht | ............ | F01D 17/162 415/160 |
| 7,448,848 B2 * | 11/2008 | Alexander | ............ | F01D 17/162 415/159 |
| 7,524,165 B2 * | 4/2009 | Bourgoin | .............. | F01D 17/162 415/160 |
| 7,588,416 B2 * | 9/2009 | Bouru | ................... | F01D 17/162 415/160 |
| 7,632,019 B2 * | 12/2009 | Gilbertson | ......... | G03G 15/6529 384/276 |
| 7,704,008 B2 * | 4/2010 | Shinozaki | ............. | F16B 21/186 24/567 |
| 7,805,799 B2 * | 10/2010 | Reid | ...................... | B60S 1/0488 15/250.3 |
| 7,828,518 B2 | 11/2010 | Evans et al. | | |
| 7,837,225 B2 | 11/2010 | Gosis et al. | | |
| 8,087,832 B2 * | 1/2012 | Blades | .................. | F16C 11/045 384/448 |
| 8,215,902 B2 * | 7/2012 | Major | .................. | F01D 17/162 29/889.22 |
| 8,240,715 B2 * | 8/2012 | Itou | ........................ | F16L 19/005 285/354 |
| 8,371,788 B2 * | 2/2013 | Lange | .................... | F16B 5/065 411/112 |
| 8,651,803 B2 * | 2/2014 | Jones | .................... | F01D 17/162 415/160 |
| 8,668,444 B2 * | 3/2014 | Jarrett, Jr. | ............. | F01D 17/162 415/160 |
| 8,794,910 B2 * | 8/2014 | Gasmen | ................ | F01D 17/162 415/160 |
| 8,813,601 B2 * | 8/2014 | Hind | ....................... | B60T 7/104 74/523 |
| 8,864,450 B2 | 10/2014 | Gasmen et al. | | |
| 9,033,632 B2 * | 5/2015 | Komsitsky | ............ | F16B 5/0208 411/182 |
| 9,409,267 B2 * | 8/2016 | Plantan | ................. | B23P 19/084 |
| 9,434,326 B2 * | 9/2016 | Walters | ................. | B60R 13/105 |
| 9,551,234 B2 * | 1/2017 | Colette | ................. | F01D 17/162 |
| 9,903,589 B2 * | 2/2018 | Hucker | ................. | F01D 25/145 |
| 2003/0131443 A1 * | 7/2003 | Trent | .................. | B60R 13/0846 16/2.1 |
| 2005/0008489 A1 * | 1/2005 | Perruchaut | ............ | F01D 17/16 416/160 |
| 2006/0193720 A1 * | 8/2006 | Bromann | ................ | F01D 17/162 415/160 |
| 2007/0270822 A1 * | 11/2007 | Heinz | .................. | A61B 17/7062 606/279 |
| 2007/0287193 A1 * | 12/2007 | Pressman | ................ | B01D 61/18 436/178 |

(56) References Cited

U.S. PATENT DOCUMENTS

| | | | |
|---|---|---|---|
| 2009/0101232 A1* | 4/2009 | Michaux | B05B 11/3049 |
| | | | 141/369 |
| 2009/0105756 A1* | 4/2009 | Richelsoph | A61B 17/7032 |
| | | | 606/246 |
| 2011/0111626 A1* | 5/2011 | Paglia | H01R 9/0524 |
| | | | 439/584 |
| 2011/0215601 A1* | 9/2011 | Mueller | B66C 1/12 |
| | | | 294/74 |
| 2012/0076658 A1 | 3/2012 | Jarrett, Jr. et al. | |
| 2012/0106882 A1* | 5/2012 | Ponnouradjou | B32B 7/12 |
| | | | 384/297 |
| 2013/0042630 A1* | 2/2013 | Muldoon | F02C 7/32 |
| | | | 60/796 |
| 2013/0089373 A1* | 4/2013 | Bax | E02D 29/14 |
| | | | 404/25 |
| 2013/0101385 A1* | 4/2013 | Schilling | F01D 17/162 |
| | | | 415/1 |
| 2015/0129635 A1* | 5/2015 | Williams | A61B 17/1155 |
| | | | 227/177.1 |
| 2015/0211243 A1* | 7/2015 | Irvine | E04F 21/0092 |
| | | | 52/126.1 |
| 2016/0160675 A1 | 6/2016 | Williamson et al. | |
| 2016/0226328 A1* | 8/2016 | Chisaka | H02K 5/225 |
| 2018/0080338 A1* | 3/2018 | Kennedy | F04D 29/563 |

FOREIGN PATENT DOCUMENTS

| | | | |
|---|---|---|---|
| CN | 104622530 | 5/2015 | |
| DE | 3938040 A1 * | 5/1991 | B66C 1/101 |
| DE | 102011086491 | 5/2013 | |
| EP | 2538035 | 12/2012 | |
| EP | 2594812 | 5/2013 | |

\* cited by examiner

VARIABLE STATOR VANE ACTUATOR OVERLOAD INDICATING BUSHING

BACKGROUND OF THE INVENTION

Technical Field

This invention relates to variable vane actuation linkage assemblies for rotating variable stator vanes in gas turbine engines. More particularly, it relates to bushings in unison rings within which are received pins connected to arms used to actuate and rotate the variable stator vanes.

Background Information

Some gas turbine engines have variable stator vane actuation systems using an actuator for driving a unison ring which rotate a stage of variable stator vanes. The variable stator vanes (VSV) are operably connected to the unison ring by crank arms for varying the angle of the vanes in each stage. The arms or levers are jointed to the ring through a pin that engages a bushing, which in turn is disposed in a hole machined in the ring for this purpose. A mechanical overload can be transmitted through the system. Such an overload can be beyond the design values of the system and be transmitted by the lever pin.

Design practices for a VSV actuation mechanism may include that any substantial overload condition must be manifested by a weak link, which does not compromise the connection between the vane and the actuation ring, and that is observable from the outside of the compressor. One recommendation is to consider a buckled lever, the preferred fuse. However, the lever arms buckling capability is significantly high, therefore, an event that causes such failure mechanism may have already compromised the integrity of the compressor airfoils or other components of the actuation system. Additionally, a light buckling of a lever may not be easily observable unless full stator inspection is completed. Hence, an engine may be working with a partially buckled lever causing off-schedule compressor operation. A less stiff lever, which may buckle at lower loading factors, may feature reduced margins in terms of strength and dynamic response. This may lead to lever arm separation in the field. Moreover, the buckling capability of most levers is higher than the transverse load capability of the vane-lever joint, hence, there may be engine events that fail this connection without offering evidence of such sliding (as it is hidden by the clamping elements) posing the risk of off-schedule operation. Usually, the clamping load of this interface cannot be increased as it is limited by the small size of the mating elements driven by low weight-compactness imperatives.

During maintenance operations, it is necessary to determine whether a more detailed inspection or refurbishment activity is required. It is desirable to have a low cost and perhaps on the wing inspection device to determine whether a more detailed inspection or refurbishment activity is required. It is also desirable to have a capability to detect compressor distress before failure and an aid to early identification of risks of failure.

SUMMARY OF THE INVENTION

A bushing includes a polygonal flange, a cylindrical barrel or body extending radially inwardly or depending from the polygonal flange, a bushing bore extending through the polygonal flange and the cylindrical barrel or body, and at least one overload indicator. The overload indicator may be frangible. The polygonal flange may be annular.

The frangible overload indicator may be on at least one spring indicator tab depending from the cylindrical barrel or body and the overload indicator may include a frangible tab at a distal end of the indicator tab. The frangible tab may be framed or delineated for easy separation from the rest of the indicator tab or bushing by a stress rising groove. A distinctive mark discernible or visible under visible or ultraviolet light may be on the frangible tab.

The bushing may include spaced apart forward and aft retaining spring tabs depending from the body and clocked or circumferentially located at or about ninety degrees with respect to the least one spring indicator tab.

The bushing may include forward and aft overhangs depending from forward and aft sections of the polygonal flange respectively.

The frangible overload indicator may include at least one frangible coupon extending between forward and aft sections of the polygonal flange. The frangible coupon may include a distinctive mark discernible or visible under visible or ultraviolet light. Stress rising forward and aft grooves may be disposed between the frangible coupon and the forward and aft sections respectively of the polygonal flange.

One embodiment of the bushing may include circumferentially spaced apart first and second spring indicator tabs depending from the cylindrical barrel or body, an overload indicating frangible tab at a distal end of each of the first and second spring indicator tabs, and overload indicating first and second frangible coupons extending between forward and aft sections of the polygonal flange. Spaced apart retaining spring tabs may depend from the body and may be clocked or circumferentially located at or about ninety degrees with respect to the first and second spring indicator tabs. Each of the retaining spring tabs may have a retaining tab on a radially inner end of the retaining spring tabs.

The bushing may be used in a gas turbine engine high pressure compressor assembly centered about an engine rotation axis and including a variable vane actuation system for actuating rotatable variable vanes in one or more variable stator vane assemblies, each of the variable stator vane assemblies including a plurality of the variable vanes having respective vane stems protruding through openings in a compressor casing, lever arms including first ends coupled to the variable vanes and second ends coupled to a unison ring for rotating the variable vanes, pins coupling the second ends to the unison ring, the unison ring including forward and aft annular sides and a plurality of bushing wall holes extending radially inwardly from a radial outer side through the unison ring to a radial inner side of the unison ring, each of the bushing wall holes including a countersink on one of the outer and inner sides and a counterbore on the other of the outer and inner sides, the pins received in bushings disposed or mounted in the bushing wall holes, each of the bushings including an annular polygonal flange and a cylindrical barrel or body extending radially inwardly or depending from the polygonal flange, each of the pins received in a bushing bore extending through the polygonal flange and the cylindrical barrel or body, circumferentially spaced apart first and second spring indicator tabs depending from the cylindrical barrel or body, an overload indicating frangible tab at a distal end of each of the first and second spring indicator tabs, and overload indicating first and second frangible coupons extending between forward and aft sections of the polygonal flange. Forward and aft overhangs may depend from forward and aft sections of the polygonal flange respectively.

The first and second frangible coupons may framed or delineated for easy separation from the rest of the polygonal flange by stress rising forward and aft grooves between frangible coupons and the forward and aft sections respectively. The frangible tab may be framed or delineated for easy separation from the rest of the indicator tab by a stress rising groove.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
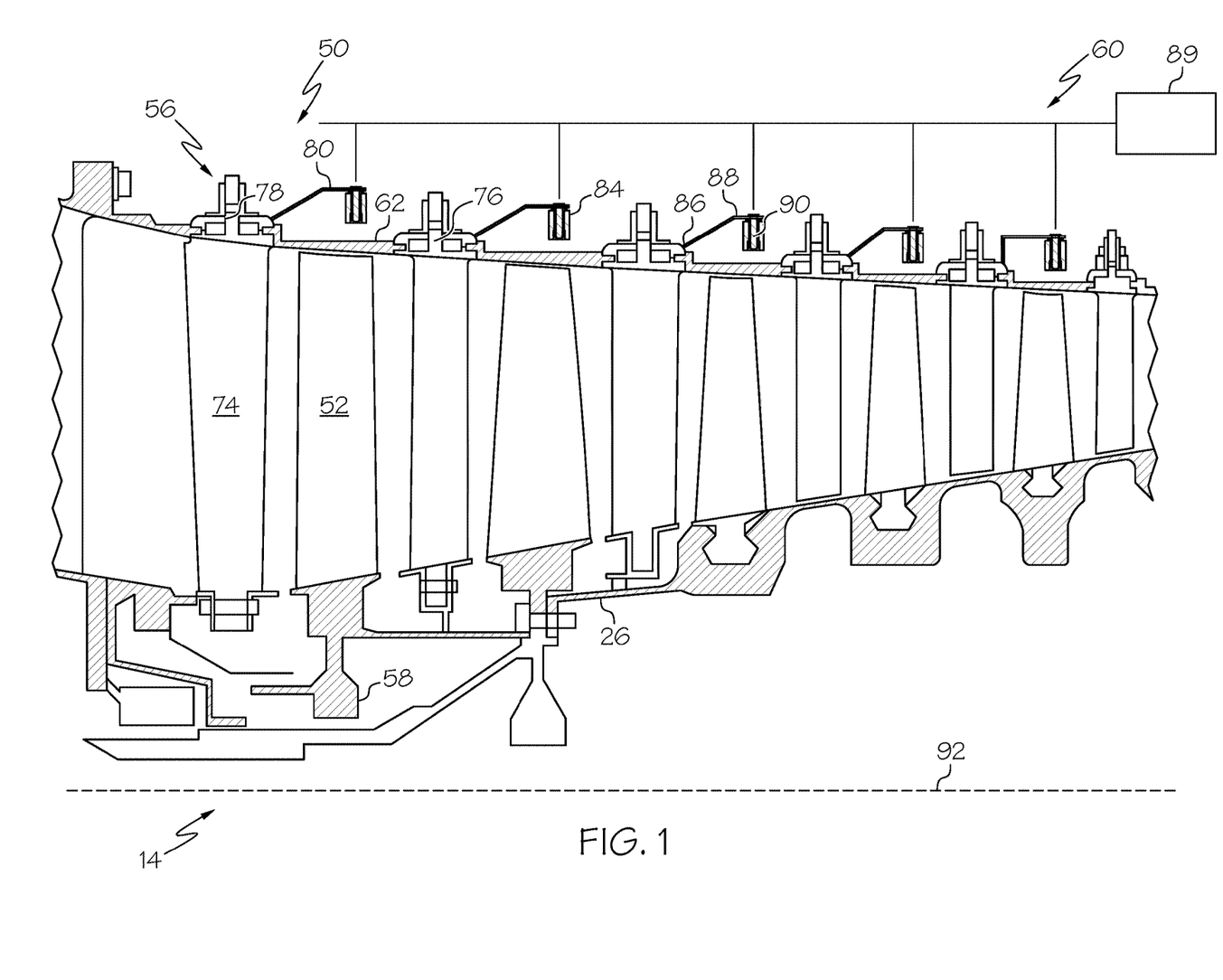
FIG. 1 is a centerline sectional schematic illustration of an exemplary gas turbine engine high pressure compressor section having variable stator vanes connected to a unison ring by arms having pins disposed in overload indicating bushings in the unison ring.

FIG. 1 illustrates a gas turbine engine high pressure compressor 14 centered about an engine rotation axis 92. The compressor 14 includes a plurality of stages 50, wherein each stage 50 includes a row of rotor blades 52 and a row of variable stator vane assemblies 56. The rotor blades 52 are supported by rotor disks 58 that are connected to a high pressure turbine (not shown) by a high pressure rotor shaft 26. The rotor blades 52 are surrounded by a stator casing 62 that supports variable stator vane assemblies 56. A variable vane actuation system 60 provides actuation for rotating variable vanes 74 in the variable stator vane assemblies 56.

Each variable stator vane assembly 56 includes a plurality of the variable vanes 74 each having a respective vane stem 76. Vane stem 76 protrudes through an opening 78 in casing 62. Each variable vane assembly 56 also includes a lever arm 80 extending from variable vane 74 that is utilized to rotate the variable vanes 74. The vanes 74 are oriented relative to a flow path through the compressor 14 to control air flow therethrough. The variable vanes 74 are coupled to a respective actuation or unison ring 84 by the lever arms 80. More specifically, each variable vane 74 is coupled to the unison ring 84 utilizing the lever arm 80. The lever arm 80 includes a first end 86 coupled to a respective variable vane 74 and a second end 88 coupled to the unison ring 84.

Figure 2:
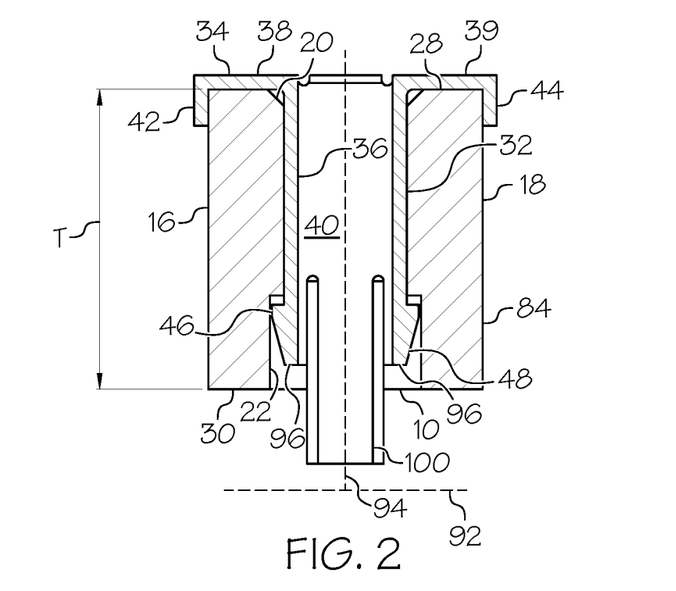
FIG. 2 is a sectional view illustration of the bushing in a portion of the unison ring illustrated in FIG. 1.

Referring to FIGS. 1 and 2, a pin 90 couples the second end 88 of the lever arm 80 to the unison ring 84. During operation, the unison ring 84 may be rotated or translated axially parallel to the engine rotation axis 92 by a linear actuator 89 of the variable vane actuation system 60. The variable vane actuation system 60 further includes the unison ring 84 and linkage including the lever arms 80 connecting the unison ring to the variable vanes 74. Since the lever arm 80 is coupled to unison ring 84, translating the unison ring 84 about engine rotation axis 92 causes the lever arm 80 to rotate vane stem 76 and, thus, variable vane 74 around an axis 94 normal to engine rotation axis 92 to facilitate positioning the plurality of variable vanes 74 in a plurality of orientations to direct air flow through compressor 14.

The unison ring 84 includes forward and aft annular sides 16, 18 and a plurality of bushing wall holes 10 extending radially inwardly from a radial outer side 28 through the unison ring 84 to a radial inner side 30 of the unison ring. Each of the bushing wall holes 10 includes a counterbore 22 on one of the outer and inner sides 28, 30. The exemplary embodiment of the unison ring 84 illustrated herein includes the counterbore 22 on the inner side 30. The pin 90 is received in a bushing 32, preferably a composite bushing, disposed or mounted in a bushing wall hole 10 in the unison ring 84. Each of the bushing wall holes 10 may also include a countersink 20 on the other of the outer and inner sides 28, 30.

Figure 3:
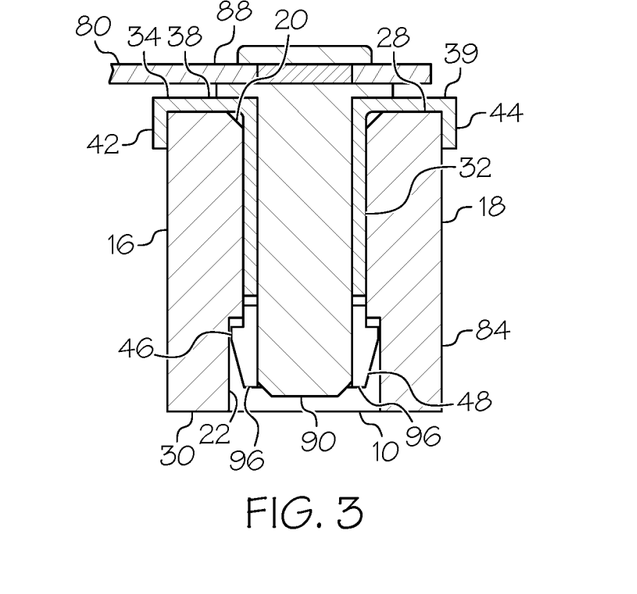
FIG. 3 is a sectional view illustration of a pin disposed in the bushing illustrated in FIG. 2.
Figure 4:
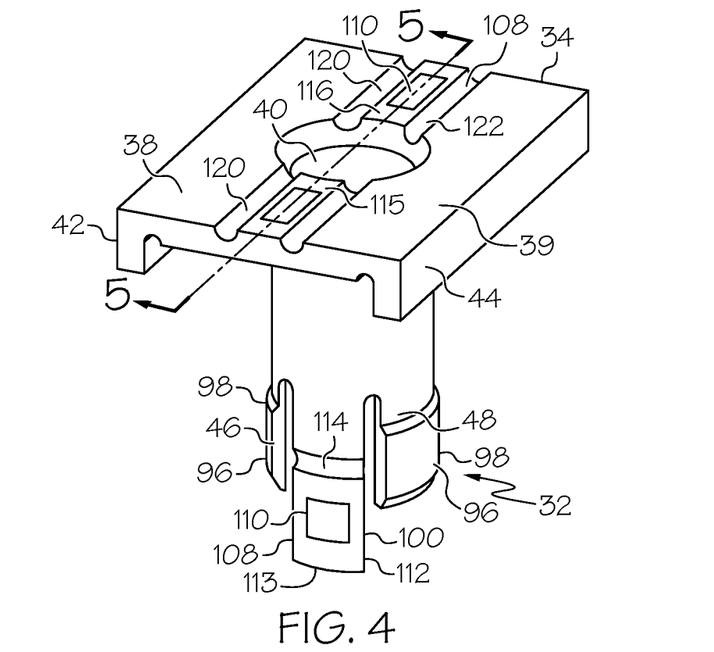
FIG. 4 is a perspective view diagrammatic illustration of the bushing illustrated in FIG. 3.

Referring to FIGS. 2-4, the bushing 32 includes a polygonal flange 34 illustrated herein as a rectangular head axially covering the unison ring 84. The polygonal flange 34 may be annular and curved about the engine rotation axis 92 to conform to the outer side 28 of the annular unison ring 84. A cylindrical barrel or body 36 extends radially inwardly or depends from the polygonal flange 34 and has a bushing bore 40 therethrough. The head extends axially over the outer side 28 of the unison ring 84. The cylindrical barrel or body 36 of the bushing 32 extends or is disposed radially inwardly from the polygonal flange 34 through the bushing wall hole 10 in the unison ring 84.

The countersink 20 can facilitate bushing assembly and clear a fillet between the polygonal flange 34 and the cylindrical barrel or body 36 the bushing 32 to prevent flange separation due to fracture.

The polygonal flange 34 includes forward and aft sections 38, 39 having forward and aft overhangs 42, 44 depending therefrom and overhanging the forward and aft annular sides 16, 18 respectively of the unison ring 84. Axially spaced apart forward and aft retaining spring tabs 46, 48 depend or extend radially inwardly from the body 36 of the bushing 32 to engage the unison ring 84 within the counterbore 22. Each of the retaining spring tabs has a retaining tab 96 on a radially inner end 98 of the retaining spring tabs. The retaining spring tabs and retaining tabs retain and secure the bushing 32 in the bushing wall hole 10.

Figure 6:
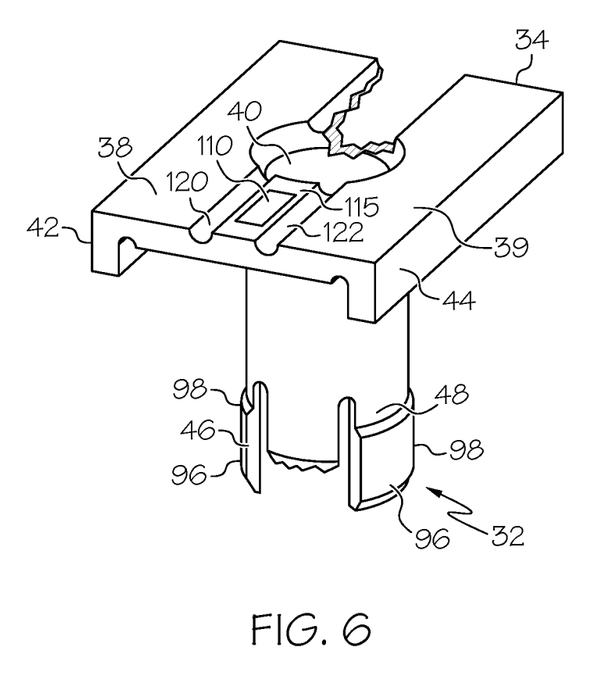
FIG. 6 is a perspective view diagrammatic illustration of the bushing illustrated in FIG. 4 with a radially extending frangible indicating tab missing and a circumferentially extending frangible indicating frangible coupon missing.

The bushing 32 further includes circumferentially spaced apart first and second spring indicator tabs 100, 102 extending radially inwardly or depending from the cylindrical barrel or body 36. The first and second spring indicator tabs 100, 102 protrude outside the radial thickness T of the unison ring 84 and radially inward of the inner side 30. The first and second spring indicator tabs 100, 102 are clocked or circumferentially located at or about ninety degrees with respect to the forward and aft retaining spring tabs 46, 48. Each of the first and second spring indicator tabs 100, 102 includes an overload indicator 108 for indicating that an overload or load beyond design values of the variable vane actuation system 60 or a part of it was transmitted by the lever pin 90 through the bushing 32 between the unison ring 84 and the lever arm 80. In the exemplary embodiment of the indicator tab disclosed and illustrated herein, the overload indicator 108 may be a low-strength section 106 of the bushing 32 and may have a distinctive mark 110. The distinctive mark 110, which may be discernible or visible under visible or ultraviolet light, makes conspicuous its absence at inspection as illustrated in FIG. 6. The distinctive mark 110 is observable from the outside of the compressor during inspection.

The low-strength section 106 of the bushing 32 may be a frangible tab 112 on the first and second spring indicator tabs 100, 102. The frangible tab 112 may be at distal ends 113 of the spring indicator tabs and framed or delineated or scored for easy separation from the rest of the bushing 32 by a stress rising groove 114. The frangible tab 112 may be easy to detach or break off from the main body of the bushing 32. The frangible tab 112 and stress rising groove 114 are designed to detach from the main body of the bushing 32 whenever a load beyond their design values and beyond design values of the bushing 32 is transmitted by the lever pin 90 between the unison ring 84 and the lever arm 80. The distinctive mark 110 may be on the frangible tab 112 and its absence, as illustrated in FIG. 6, is observable from the outside of the compressor during inspection. The first and second spring indicator tabs 100, 102 include the overload indicator 108.

Figure 5:
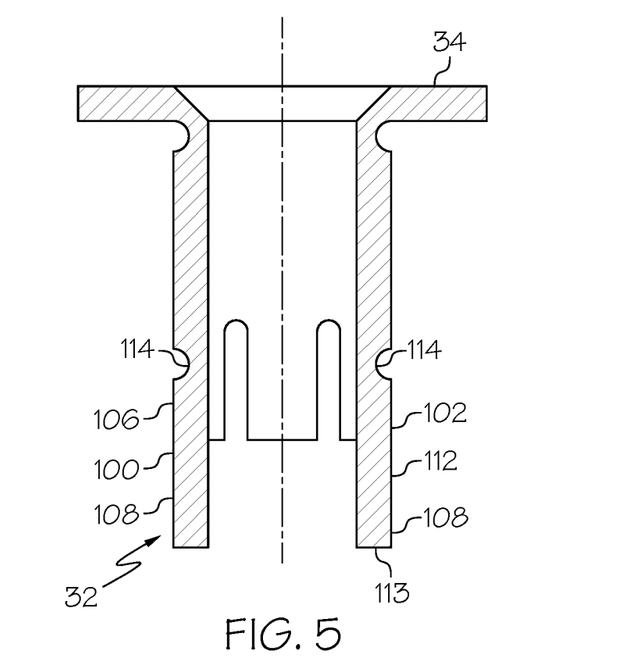
FIG. 5 is a sectional view diagrammatic illustration of the bushing through 5-5 in FIG. 4.

Illustrated in FIGS. 4-6 is another embodiment of the overload indicator 108 for indicating that an overload or load beyond design values of the variable vane actuation system 60 or a part of it was transmitted by the lever pin 90 through the bushing 32 between the unison ring 84 and the lever arm 80. The overload indicators 108 may include first and second frangible coupons 115, 116 extending between the forward and aft sections 38, 39 of the polygonal flange 34. Each of the first and second frangible coupons 115, 116 may be framed or delineated or scored for easy separation from the rest of the polygonal flange 34 by stress rising forward and aft grooves 120, 122 between frangible coupons and the forward and aft sections 38, 39 respectively.

The frangible coupons are easy to detach or break off from the polygonal flange 34. The first and second frangible coupons 115, 116 and stress rising forward and aft grooves 120, 122 are designed to detach from the main body of the bushing 32 whenever a load beyond their design values and beyond design values of the bushing 32 is transmitted by the lever pin 90 between the unison ring 84 and the lever arm 80. The first and second frangible coupons 115, 116 may have a distinctive mark 110. The distinctive mark 110 may be discernible or visible under visible or ultraviolet light and make conspicuous its absence at inspection as illustrated in FIG. 6. The distinctive mark 110 is observable from the outside of the compressor during inspection.

The present invention has been described in connection with specific examples, embodiments, materials, etc. However, it should be understood that they are intended to be representative of, rather than in any way limiting on, its scope. Those skilled in the various arts involved will understand that the invention is capable of variations and modifications without departing from the scope of the appended claims.

What is claimed:

1. A bushing comprising: a flange, a cylindrical barrel or body extending radially inwardly or depending from the flange, a bushing bore extending through the flange and the cylindrical barrel or body, a spring indicator tab depending from the cylindrical barrel or body, and a frangible overload indicator on the spring indicator tab and spaced apart forward and aft retaining spring tabs depending from the body and clocked or circumferentially located at or about ninety degrees with respect to the spring indicator tab, wherein the forward and aft retaining spring tabs do not include frangible overload indicators.

2. The bushing as claimed in claim 1, wherein the frangible overload indicator includes a frangible tab at a distal end of the spring indicator tab.

3. The bushing as claimed in claim 2, further comprising the frangible tab framed or delineated for easy separation from the rest of the spring indicator tab or bushing by a stress rising groove.

4. The bushing as claimed in claim 2, further comprising the frangible tab including a distinctive mark discernible or visible under visible or ultraviolet light.

5. The bushing as claimed in claim 1, further comprising the flange being annular.

6. The bushing as claimed in claim 1, wherein:
the frangible overload indicator includes a frangible tab at a distal end of the spring indicator tab,
the frangible tab includes a distinctive mark discernible or visible under visible or ultraviolet light, and
the flange is annular.

7. The bushing as claimed in claim 6, further comprising forward and aft overhangs depending from forward and aft sections of the flange respectively.

8. The bushing as claimed in claim 1, further comprising the frangible overload indicator including a frangible coupon extending between forward and aft sections of the flange.

9. The bushing as claimed in claim 8, further comprising the flange being annular.

10. The bushing as claimed in claim 9, further comprising spaced apart forward and aft retaining spring tabs depending from the body and clocked or circumferentially located at or about ninety degrees with respect to the frangible coupon.

11. The bushing as claimed in claim 10, further comprising the frangible coupon including a distinctive mark discernible or visible under visible or ultraviolet light.

12. The bushing as claimed in claim 11, further comprising forward and aft overhangs depending from the forward and aft sections of the flange respectively.

13. The bushing as claimed in claim 12, further comprising stress rising forward and aft grooves between the frangible coupon and the forward and aft sections respectively of the flange.

14. A gas turbine engine high pressure compressor assembly centered about an engine rotation axis, the assembly comprising:
variable vane actuation system for actuating rotatable variable vanes in one or more variable stator vane assemblies,
each of the variable stator vane assemblies including a plurality of the variable vanes having respective vane stems protruding through openings in a compressor casing,
lever arms including first ends coupled to the variable vanes and second ends coupled to a unison ring for rotating the variable vanes,
pins coupling the second ends to the unison ring,
the unison ring including forward and aft annular sides and a plurality of bushing wall holes extending radially inwardly from a radial outer side through the unison ring to a radial inner side of the unison ring,
each of the bushing wall holes including a countersink on one of the outer and inner sides and a counterbore on the other of the outer and inner sides,
the pins received in bushings disposed or mounted in the bushing wall holes, each of the bushings including an annular polygonal flange and a cylindrical barrel or body extending radially inwardly or depending from the annular polygonal flange, each of the pins received in a bushing bore extending through the annular polygonal flange and the cylindrical barrel or body, circumferentially spaced apart first and second spring indicator tabs depending from the annular cylindrical barrel or body, an overload indicating frangible tab at a distal end of each of the first and second spring indicator tabs, and overload indicating first and second frangible coupons extending between forward and aft sections of the annular polygonal flange.

15. The assembly as claimed in claim 14, further comprising spaced apart forward and aft retaining spring tabs depending from the body and clocked or circumferentially located at or about ninety degrees with respect to the first and second spring indicator tabs and each of the retaining spring tabs has a retaining tab on a radially inner end of the retaining spring tabs and disposed in the counterbore.

16. The assembly as claimed in claim 15, further comprising the overload indicating frangible tab and the first and second frangible coupons including a distinctive mark discernible or visible under visible or ultraviolet light.

17. The assembly as claimed in claim 16, further comprising forward and aft overhangs depending from forward and aft sections of the annular polygonal flange respectively.

18. The assembly as claimed in claim 17, further comprising the first and second frangible coupons framed or delineated for easy separation from the rest of the annular polygonal flange by stress rising forward and aft grooves between frangible coupons and the forward and aft sections respectively.

19. The assembly as claimed in claim 18, further comprising the overload indicating frangible tab framed or delineated for easy separation from the rest of the spring indicator tabs by a stress rising groove.

20. The bushing as claimed in claim 2, wherein the flange is a polygonal flange.

21. A bushing comprising: a flange, a cylindrical barrel or body extending radially inwardly or depending from the flange, a bushing bore extending through the flange and the cylindrical barrel or body, a spring indicator tab depending from the cylindrical barrel or body, and a frangible overload indicator on the spring indicator tab, and spaced apart forward and aft retaining spring tabs depending from the body and clocked or circumferentially located at or about ninety degrees with respect to the spring indicator tab, wherein the forward and aft retaining spring tabs do not include frangible overload indicators, and wherein the frangible overload indicator is designed to break off from the cylindrical barrel or body whenever a load beyond design values is transmitted through the bushing.

22. The bushing as claimed in claim 21, wherein the frangible overload indicator includes a frangible tab at a distal end of the spring indicator tab.

23. The bushing as claimed in claim 22, wherein the frangible tab is framed or delineated for easy separation from the rest of the spring indicator tab by a stress rising groove.

24. The bushing as claimed in claim 21, further comprising forward and aft overhangs depending from forward and aft sections of the flange respectively.

25. The bushing as claimed in claim 22, further comprising the frangible tab including a distinctive mark discernible or visible under visible or ultraviolet light.

* * * * *